March 14, 1944. J. LOHSE 2,344,440
APPARATUS FOR DIRECTLY PRODUCING METALS FROM ORES
Filed Oct. 26, 1940 3 Sheets-Sheet 1

Inventor:
Julius Lohse
By Watson E. Coleman
Attorney.

March 14, 1944.  J. LOHSE  2,344,440
APPARATUS FOR DIRECTLY PRODUCING METALS FROM ORES
Filed Oct. 26, 1940  3 Sheets-Sheet 2

Inventor:
Julius Lohse
By Watson E. Coleman
Attorney

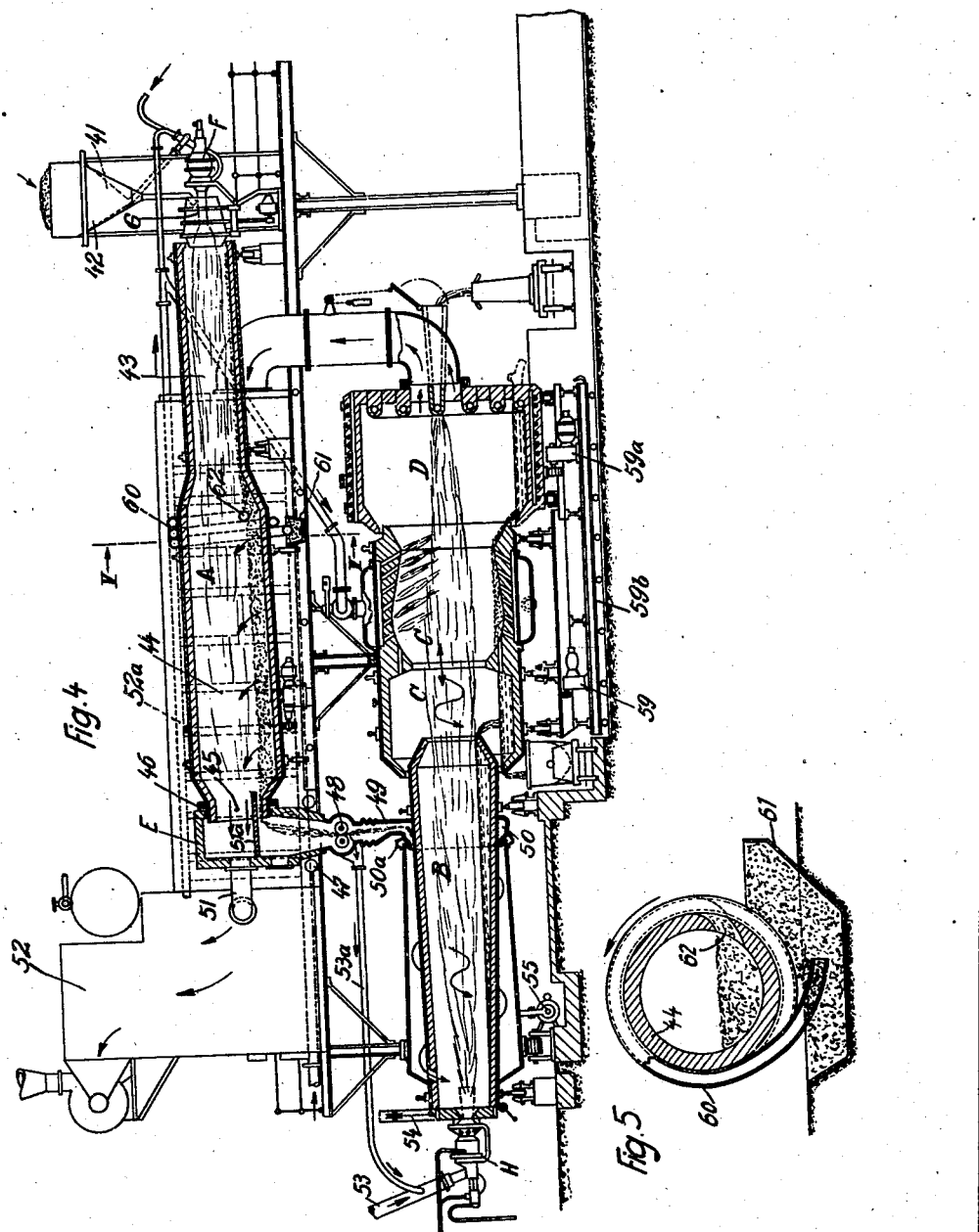

Patented Mar. 14, 1944

2,344,440

UNITED STATES PATENT OFFICE 2,344,440

APPARATUS FOR DIRECTLY PRODUCING METALS FROM ORES

Julius Lohse, Berlin, Germany; vested in the Alien Property Custodian

Application October 26, 1940, Serial No. 363,041 In Germany April 4, 1936

14 Claims. (Cl. 266—10)

My invention relates to apparatus for directly producing pig iron and steel from ores, and has for its object to provide an improved apparatus by which a finished product may be made by applying operations that follow one another uninterruptedly.

Another object of the invention is to provide an improved metallurgical apparatus for directly producing metals from ores wherein the several chambered parts of the apparatus are coupled or joined together so that the ore and metal removed therefrom may pass through its several stages of treatment directly from one chamber to the other until the final stage is reached, without being exposed to the atmosphere and without material change of temperature.

Another object of the invention is to provide an apparatus of the character stated which is designed so that from the time of introducing the charge up to the production of the finished product, the various stages of producing the pig iron and steel, or electric steel, succeed one another uninterruptedly without heat loss and without requiring interposed conveying operations between the stages.

Still another object of the invention is to provide an apparatus or plant for the direct continuous production of copper from sulphide ores, which plant comprises a plurality of rotary furnaces serving for preroasting copper ores, a furnace part attached to the preroasters, a rotary roasting drum built into the furnace part, a rotary nozzle operated smelting drum, and a rotary heating and refining drum.

The invention is illustrated by way of example in the accompanying drawings, in which Fig. 1 shows an axial longitudinal section of a rotary furnace plant constructed according to my invention;

Fig. 4 shows a rotary furnace plant according to my invention including apparatus for pretreating the ore; and Fig. 5 is a transverse section taken substantially on the line V—V, of Fig. 4.

Figure 1:
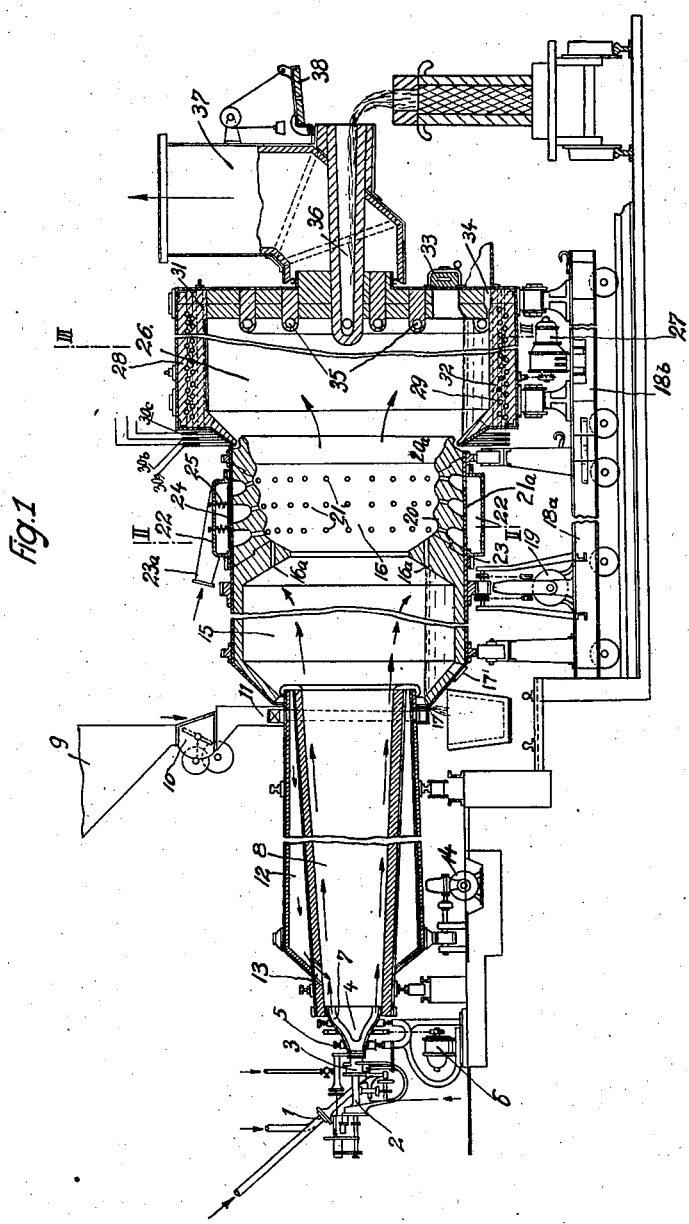
Figure 2:
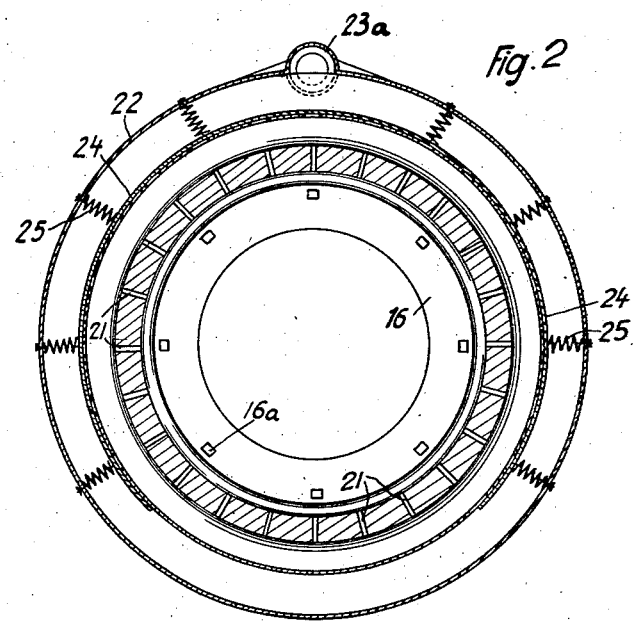
Fig. 2 is a transverse section taken substantially on the line of Fig. 1.
Figure 3:
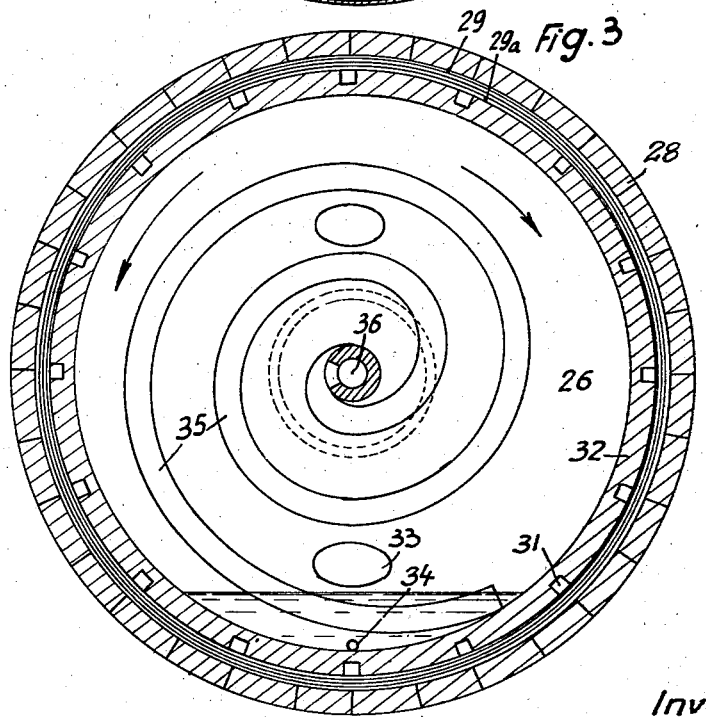
Figure 3 is a transverse section taken substantially on the line III—III of Figure 1.

In the apparatus as illustrated in Figures 1 to 3, inclusive, there is provided the tube 1 through which is conveyed under air pressure of from 5 to 6 atmospheres, constituents of the calculated charge reduced by grinding or in any other suitable manner to a particle fineness of 10 mm. or less, into a burner 2. This burner is provided with a nozzle 3 in which the finely ground material of the charge is mixed under atmospheric pressure with heating oil introduced under a pressure of approximately 40 atmospheres, or fuel gas under a pressure of from 5 to 6 atmospheres. The fine material is projected from the burner nozzle into a heater unit 4 which is supported on suitable bearings 5 for rotation by the electric motor 6.

The burner 4 has a highly refractory lining jacket 7, the surface of which is channeled longitudinally with respect to the apparatus so that the flame of the burning material will issue from the rotating heater along a spiral path.

The numeral 8 designates the horizontally disposed elongated preheater cylinder or furnace which is slightly tapered, as illustrated, and which has the rotating heater 4 disposed within its narrower end or disposed to discharge the whirling flame into the narrow end, as illustrated. This presmelter is supported for rotation on its longitudinal axis and is lined throughout with refractory brick or other refractory material, against which lining the flame of the introduced charge, impinges as it moves toward the larger end of the presmelter. Disposed above the presmelter structure adjacent the larger end thereof is a storage hopper 9 in which is placed granular ore material having a particle size preferably of from 10 to 30 mm. and the ore is fed downwardly through a pendulum feeder 10 and feeder shovel 11 to a drying and preheating jacket 12 which encircles the presmelter, as illustrated. This jacket is of substantially the same diameter throughout so that the space between the jacket and the presmelter structure gradually increases toward the narrower end of the presmelter so that the ore introduced into the jacket will be gradually worked toward the inlet end of the presmelter where it will enter from the preheater jacket through the inlet opening 13. Thus, the ore will be raised in temperature through contact with the wall of the presmelter cylinder or furnace.

The length of the presmelter furnace 8 is designed for operation at furnace speed, which is facilitated by a regular motor drive 14.

At the larger and outlet end of the presmelter, there is located the second furnace unit which comprises two cylindrical sections which comprise a collector cylinder or chamber 15 and a purifying chamber 16. These chambers are open at their opposite ends as shown and are supported for rotation on the longitudinal axis of the chamber and the larger or discharge end of the presmelter extends into the open end of the chamber 15, as illustrated, so that the molten ore mass will gradually pass from the presmelter into the collector chamber 15. The collector chamber is of sufficient size and depth to insure desired separation of the slag and pig iron. The slag flows on top of the molten iron and continuously flows over the edge of the opening of the tapered end wall of the collector cylinder into cars or other suitable receptacles, as indicated at 17, by which cars the slag may be conveyed to a waste dump.

A tap hole 17' is also provided in the tapered end wall of the collector cylinder to permit, at the necessary stage, the rapid discharge of pig iron, into suitable receivers, not shown.

The numerals 18$^a$ and 18$^b$ designate a traveling platform upon which the chambered cylinders 15 and 16 are mounted together with parts of the apparatus hereinafter to be described. By this means, the collector and mixing chamber, together with the purifying chamber, can be readily separated from the presmelter structure when desired.

Rotation of the cylinders 15 and 16 is effected through the medium of the electric motor drive structure which is conventionally illustrated and generally indicated by the numeral 19.

The cylinders 15 and 16 have interposed therebetween an annular wall, as shown, through which are formed the axially directed channels 16$^a$ which are preferably of square section. This annular wall forms a dam partition against which the molten material gradually rises until it reaches the level where it can pass through the channels or passageways 16$^a$ into the fining or purifying chamber or compartment 16.

As illustrated, the compartment or chamber 16 has its wall formed to have the annular corrugations 20, while the outlet end of the chamber 16 has the terminal lip corrugation 20$^a$ over which the molten pig iron flows in passing from the fining or purifying chamber. These corrugations 20 form an inner terraced face for the furnace shell and there are, consequently, formed between the corrugations annular channels through which open the annular series of nozzle holes 21.

Around the portion of the structure having the nozzle holes 21, is an outer furnace jacket made of strong boiler plate which is correspondingly perforated and which has its outside surface turned or ground over a prescribed width. This plate is indicated by the reference character 21$^a$.

The ground surface of the plate 21$^a$ is surrounded by a two-part cast iron wind box 22 which is provided with stuffing boxes 23 and a supply connection 23$^a$ for air or air enriched in oxygen.

As shown in Figure 2, the perforated portion of the outer furnace jacket 21$^a$ is covered through approximately three-fourths of the circumference of the furnace structure by a thin resilient steel band 24 which is lightly forced against the rotating furnace jacket which it encircles, by springs 25.

At the outlet end of the purifying chamber there is disposed the cylindrical refining chamber 26 into the open end of which the lipped end or terminal corrugation 20$^a$ of the purifying chamber 16, extends, as shown, to guide the molten pig iron into the refining chamber 26.

The metallurgical operations in the fining space 16 are as follows:

The pig iron containing numerous impurities, as sulphur, phosphorus, carbon, and slag inclusions, flows slowly through the square channels 16$^a$ over the annular channels mentioned, arranged one below the other in terrace fashion, in a uniform thin stream and is subjected from below in known manner to the action of a blast of air rich in oxygen which may be supplied to the tuyères by a compressor of an oxygen plant, not shown. The sulphur content, partly removed already in the presmelter 8, is now completely eliminated through the action of oxygen, and in the same way phosphorus combines with the oxygen and escapes in gaseous form. The waste gases may be utilized in the usual way for heating purposes. Finely ground lime powder may be blown into the tuyères in known manner, whereby calcium sulphide or calcium phosphates will be formed. The slag together with the decarburized steel floats to the third furnace chamber 26, and, after an electro-thermal treatment by the apparatus hereinafter set forth during which the last traces of phosphorus and sulphur are removed, is discharged as so-called electric slag through a taphole and filled into cars.

The third furnace unit, or refining furnace chamber 26 into which flows the steel decarburized in the fining space 16, is rotated by a motor 27 and rests with its sets of rollers and turning means on the travelling platform 18$b$. The travelling platforms 18$a$, 18$b$, are interconnected by a suitable separable coupling, not shown; so that in case of repairs to be made on the end walls of the chamber 26 or the electro-thermal heating system thereof the chamber may be uncoupled and drawn out as far as required. The refining chamber 26 possesses a strong sheet metal furnace jacket having a silica brick lining 28 laid on a heat insulating support and provided with grooves. On this silica lining 28 are wound several layers of strong copper rope 29, which are electrically separated from one another. The ropes represent therefore coils and are connected to strong copper slip rings 30$a$, 30$b$, 30$c$ disposed outside the furnace. Steel briquettes 31 are embedded in a resistance mass 32 which is a poor current conductor, highly refractory and rammed in in sufficient thickness over the copper rope coils. These steel briquettes 31 can be easily withdrawn, for repairs or removal. The electric heating system described by way of example represents a high frequency furnace, which is operated at three-phase or alternating current of medium or high frequency. The metal bath is heated from above by the burner gases, from the side by the radiation of the revolving front face of the furnace and from below by the induced bottom currents.

With the aid of this device chemico-metallurgical refining can be performed as in the known induction furnaces with respect to recarburization and the production of alloy steels. Substances required for refining are introduced through a door 33 below which an auxiliary taphole 34 with spout is provided, though a finished charge is usually discharged by turning the furnace from right to left, seen from the front, whereas during the heating and filling turning in the other direction is required, as indicated in Fig. 3. Automatic discharge for pouring, or filling iron molds placed on a casting bogie, is effected for instance by means of a worm 35 built up of highly refractory hollow bricks and inserted in the end wall in the form of an Archimedean spiral. The worm 35 discharges into a conical outlet pipe 36, also consisting of a refractory material and exchangeably arranged in a waste heat connection 37 which does not participate in the rotation. A flap 38 normally closes up the outlet 36. The elbow 37 may be preferably connected to a waste heat boiler, not shown, and equipped with an induced draft chimney and flue dust catcher. The casting worm 35 and the discharge pipe 36 are uniformly heated from the furnace by their position so as to avoid harmful elongation. The heating of the furnace chamber 26 by fuel gases and bottom currents effects a perceptible saving in current compared with all types of known electric furnaces, which saving is due to the arrangement of the three furnace spaces in the manner described to form a unitary structure.

The not inconsiderable amounts of waste heat can be utilized for boiler and a steam turbo-dynamo, operation or in any other suitable manner.

The rotary furnace plant shown in Figs. 4 and 5 embraces, in addition to the production of pig iron and steel, the pretreatment of the ores.

This plant comprises an upper furnace drum A which serves for pretreating the fine and coarse ores, and the lower directly connected drums B, C and D arranged on a common axis are used for obtaining the finished product and generally correspond to the drums or furnace units shown in Figure 1. The upper and lower drums are connected by a closed transition chamber E. At the upper end of the drum A an auxiliary burner F and a rotating flame divider G like those of Figure 1 are provided, and the upper end of the lower series of drums is fitted with a rotatable and swingable main burner H. Those parts of this furnace plant serving for the direct production of the finished product from pretreated ores are generally of the same construction as the parts of Figs. 1–3.

The pretreating drum A is in two integral chamber sections 43 and 44 and is supplied with fine ore from the hopper 41 through the burner F and with coarser material from the hopper 42 through the rotating flame divider G. Due to the action of the flame of the burner F, the fine and coarse ores are discharged into the drying, roasting and calcining zone of the chamber 43 which leads directly into the chamber 44 which is of larger diameter, and in which a reducing zone is formed. At the point of transition between these two zones 43 and 44 means is provided for introducing reduction coal which, as can be particularly clearly seen in Fig. 5, comprises a helical track 60 connected with the outer circumference of the drum A, which opening with a radial orifice outside the drum A and, during rotation thereof, passing through a filling receptacle 61. An opening 62 of the track 60 at the other end lies within the inner wall of the drum A. When the latter revolves in the direction of the arrow, the helical channel 60 on passing through the receptacle 61 picks up reduction coal which, during further rotation of the drum, moves through the opposite opening 62 under the ore bed in the drum A, which bed, due to the inclination of the drum and its rotation, gradually advances from the higher to the lower end of the drum. The length of the reducing chamber 44 is so dimensioned relative to that of the roasting and calcining chamber 43 that a continuous sequence of operations up to the contracted outlet end 45 of the reducing chamber 44 is obtained, the contracted outlet end 45 opens with interposed sealing means 46, into the closed transition chamber E. The chamber E is movably supported on rails 47 and is fitted below with a redisintegrator 48 and a down pipe 49 which communicates with the preheating space of the premelting furnace B through an annular entering member 50 provided with packing means 50a. The gases formed in the reduction furnace A carry valuable waste heat and are guided through a pipe 51 to the combustion space of a waste heat boiler 52, and the protective arch 51a serves for preventing reoxidation of the treated material and insures safe discharge.

The furnace head of the drum B supports the main burner H which can be moved so that it will cover with the flame the inner wall of the smelting drum B in an axial direction to prevent the formation of deposits. From below the disintegrator 48 a piping 53a leads to the coal dust supply piping 53 of the burner H, so that the powdery matter produced in the disintegrator 48, owing to the suction developed in the burner, is directly conveyed in a state of suspension to the flame. The main burner H is secured to the furnace door 54, capable of being lowered and raised, so as to render the furnace head accessible for repairs. The rotary drum B is driven by a separate motor 55 and discharges, under the action of the main burner H, the liquid metal from the pretreated ores, which then passes to the lower end and into the first chamber of the two-chamber drum C whence the slag can be rearwardly removed as indicated in the drawing and the collected pig iron is exposed to the blast in the central portion in a shallow stream before it enters the refining unit D, in which, by superheating and induced currents, the remaining sulphur and phosphorus, through the addition of quicklime, are separated in the form of electric slag, and recarburization and possibly also alloying may take place. The waste gases developed during these steps and also in the chambers B, C, D pass through a hot blast stove 52a arranged in front of the waste heat boiler 52. The parts C and D are separately driven by a three-phase motor arrangement 59, 59a and mounted on a travelling platform 59b which is used during repairs. The tuyère member for drum C is removable to permit renewal of the lining.

In the use of the apparatus continuity of the process can be attained without difficulty by correspondingly dimensioning the chambers A, B, C, D as to length and imparting properly related speeds to them. Instead of being superposed as shown, the pretreating chamber A may also be disposed on the side or in front of the smelting fining and refining drums axially fitting into one another. In this case, the transition chamber E would remain; though slightly changed in structure.

What I claim as new and desire to secure by Letters Patent:

1. A rotary furnace plant of the character stated comprising, a rotary smelting drum, a rotary collecting and slag separating drum, and a rotary fining drum, said rotary drums being arranged for turning on a common axis, the drums having directly connected openings whereby a constant flow of molten material may proceed through the drums a flame producing burner directed axially into the smelting drum, means for feeding disintegrated screened ores into the smelting drum with the flame of said flame burner and for supplying said burner with a reducing agent, said fining drum being fitted with air tuyères, means for feeding coarser ore material into said smelting drum adjacent to but in front of said burner, and means between said collecting drum and said fining drum for transferring the molten material in the form of a shallow stream into said fining drum.

2. A rotary furnace plant, said plant comprising a rotary smelting drum, a rotary collecting and slag separating drum, and a rotary fining drum, said rotary drums being interconnected and disposed on a common axis for the constant flow of molten material therethrough a flame producing burner directly axially into the smelting drum at the end remote from the other drums, means for feeding disintegrated screened ores into the smelting drum with the flame of said flame burner, means in connection with said burner for supplying said burner with a reducing agent, said fining drum being fitted with air tuyères, means for feeding coarser ore material into said smelting drum adjacent to and in front of said burner, means between said collecting drum and said fining drum for transferring the molten material in the form of a shallow stream into said fining drum, a rotary refining drum axially alined with and coupled to said fining drum and arranged to receive the fined product at a level lower than the level of the fining drum, means for subjecting the received products to additional heat in the refining drum, and means for continually discharging the refined product from said refining drum.

3. A rotary furnace plant, said plant comprising a rotary smelting drum, a rotary collecting and slag separating drum, and a rotary fining drum, said rotary drums being interconnected and disposed on a common axis for the constant flow of molten material therethrough a flame producing burner directed axially into the smelting drum at the end remote from the other drums, means for feeding disintegrated screened ores into the smelting drum with the flame of said flame burner, means in connection with said burner for supplying said burner with a reducing agent, said fining drum being fitted with air tuyères, means for feeding coarser ore material into said smelting drum adjacent to and in front of said burner, a rotary refining drum connected to said fining drum to receive the fined product therefrom, means in connection with said refining drum for subjecting the received product to additional heat, means for discharging the refined product from said refining drum, and a heating chamber for the coarser ore to be fed into said smelting drum adjacent its burner, said heating chamber enmantling said smelting drum and having a material supporting wall sloping toward the burner end of the smelting drum whereby the ore to be heated is caused to move in opposition to the direction of movement of the material within said smelting drum.

4. A rotary furnace plant, comprising, a rotary smelting drum, a combined rotary collecting and rotary fining drum, said rotary drums being interconnected and disposed on a common axis for the constant flow of molten material therethrough a flame producing burner directed axially into the smelting drum at the end remote from the other drums, means for feeding disintegrated screened ores into the smelting drum with the flame of said flame burner, means in connection with said burner for supplying said burner with a reducing agent, said fining drum being fitted with air tuyères, means for feeding coarser ore material into said smelting drum adjacent to and in front of said burner, means in connection with each rotatable drum for actuating each drum independently of the others, and a car for said combined collecting and fining drum whereby the latter is rendered movable independent of said rotatable smelting drum.

5. A rotary furnace plant comprising a rotary roasting drum, a flame producing burner at one end of said rotary drum, means for feeding screened ores to said burner, means for feeding disintegrated ores into the flame produced by said burner, a stationary externally closed transition chamber at the other end of said roasting drum, a rotary smelting drum arranged in parallel relation to said roasting drum and having a feed end, a connection between the transition chamber and the feed end of said smelting drum by which roasted ores are transferred to the latter, a rotary collecting and slag separating drum and a rotary fining drum disposed on a common axis with one another and with the smelting drum and so arranged that a constant flow of molten material passes therethrough a flame producing burner at the said feed end of the smelting drum, means in connection with said burner for supplying said burner with a reducing agent and with a fuel, means between said collecting drum and said fining drum for transferring the collected molten material to said fining drum, and air tuyères for introducing air into the metal in the fining drum.

6. A rotary furnace plant, comprising a rotary roasting drum, a flame producing burner at one end of said rotary drum, means for feeding screened ores to said burner, means for feeding disintegrated ores into the flame produced by said burner, a stationary externally closed transition chamber at the other end of said roasting drum, means in connection with said transition chamber for withdrawing from the roasting drum the gaseous products formed therein, a rotary smelting drum arranged in parallel relation to said roasting drum and having a feed end, a connection between said transition chamber and the feed end of said smelting drum by which roasted material is transferred to the latter, a rotary collecting and slag separating drum and a rotary fining drum disposed on a common axis with one another and with the smelting drum and so arranged that a constant flow of molten material passes therethrough a flame producing burner at the said feed end of the smelting drum, means in connection with said burner for supplying said burner with a reducing agent and with a fuel means between said collecting drum and said fining drum for transferring the collected molten material to said fining drum, said fining drum being fitted with air tuyères, means within the transition chamber for disintegrating the roasted ores passing therethrough to the smelting drum, and a pipe connected between the last named burner and said disintegrating means for feeding fine roasted parts from the disintegrator to the burner.

7. A rotary furnace plant, comprising a rotary roasting drum, a flame producing burner at one end of said rotary drum, means for feeding screened ores to said burner, means for feeding disintegrated ores into the flame produced by said burner, a stationary externally closed transition chamber at the other end of said roasting drum, a rotary smelting drum arranged in parallel relation to said roasting drum and having a feed end, a connection between said transition chamber and the feed end of said smelting drum, a rotary collecting and slag separating drum and a rotary fining drum disposed on a common axis with one another and with the smelting drum and so arranged that a constant flow of molten material passes therethrough a flame producing burner at the said feed end of the smelting drum, means in connection with said burner for supplying said burner with a reducing agent and with a fuel, means between said collecting drum and said fining drum for transferring the collected molten material to said fining drum, said fining drum being fitted with air tuyères, the said transition chamber being constructed as a movable furnace head, an ore heating chamber between the discharging end of the transition chamber and the smelting drum and surrounding the smelting drum and rotating therewith, and means for feeding ore from the heating chamber into the smelting drum.

8. A rotary furnace plant, comprising a rotary roasting drum, a flame producing burner at one end of said rotary drum, means for feeding screened ores to said burner, means for feeding disintegrated ores into the flame produced by said burner, a stationary externally closed transition chamber at the other end of said roasting drum, a rotary smelting drum arranged in parallel relation to said roasting drum, and having a feed end, a connection between said transition chamber and the feed end of said smelting drum by which roasted ores are transferred to the latter, a rotary collecting and slag separating drum and a rotary fining drum disposed on a common axis with one another and with the smelting drum and so arranged that a constant flow of molten material passes therethrough a flame producing burner, means in connection with said burner for supplying said burner with a reducing agent, means between said collecting drum and said fining drum for transferring the collected molten material to said fining drum, said fining drum being fitted with air tuyères, means within the transition chamber for disintegrating the roasted ores passing therethrough, means in said transition chamber for withdrawing gaseous products from the roasting drum, the rotary roasting drum comprising an enlarged section for collecting the roasting charge introduced at one end, means adjacent the said one end for feeding the roasting charge a deoxidizing agent, means within said transition chamber for shielding the roasted ore against reoxidation by gaseous products formed during the roasting treatment, and a pipe connected between the outlet side of the disintegrating means and of the burner of said smelting chamber for carrying fine particles from the disintegrator into the flame within the smelting drum.

9. In a rotary furnace structure of the character described, including a plurality of drums supported in axial alinement for rotation, a smelting drum of gradually increasing diameter from one end to the other, the end of larger diameter constituting the discharge end and opening into a second drum, a flame producing burner disposed at the narrower end of the smelting drum and directed axially therethrough, means for introducing ore into the drum through said burner, a preheater jacket encircling the smelting drum and extending substantially the entire length thereof, means for introducing ore into said jacket adjacent the larger end of the smelting drum, and means for introducing ore into the drum from the jacket adjacent the smaller end of the smelting drum.

10. A structure as set forth in claim 9 including mechanism for disintegrating the ore prior to its introduction into the jacket, and means for conducting ore dust from said disintegrating mechanism to the first mentioned ore introducing means.

11. A rotary furnace plant comprising an elongated smelting drum, a collector drum, a fining drum and a refining drum, said drums being supported in axial alinement for rotation on a common axis, said smelting drum being of gradually increasing diameter from one end to the other and having the end of larger diameter extending into the collector, said fining drum having an end extending into the refining drum, the refining drum being of larger diameter interiorly than the other drums, a flame producing burner in the smaller end of the smelting drum and directed axially therethrough, means for introducing ore into the smelting drum at the smaller end thereof, means for rotating the drums, means encircling the refining drum for heating the same independently of the heating action of the flame, a molten material outlet at the axial center of the refining drum, and means for effecting the movement of molten material from the lowest part of the refining drum to said outlet while the refining drum is rotating.

12. A furnace structure as set forth in claim 11 in which the refining drum heating means comprises an electrical jacket around the refining drum and turning therewith, and means for conducting electric current to said jacket.

13. A rotary furnace as set forth in claim 11 in which the means for conducting the molten material to the outlet of the refining drum comprises a spiral conduit having one end opening into the refining drum at a point remote from the axial center and having the other end opening into said outlet.

14. In a furnace structure of the character described an elongated cylindrical body of substantially constant diameter from one end through a portion of its length and of increased diameter through the remaining portion of its length, the portion of smaller diameter constituting a roasting chamber and the portion of larger diameter constituting a reducing chamber, a flame producing burner directed into the roasting chamber for the projection of a flame axially therethrough and through the reducing chamber, means for introducing ore into the roasting chamber with the flame, said cylindrical body being supported at a slight inclination and for rotation on its long axis and being open at the end of the reducing chamber remote from the burner for the discharge of roasted ore, and means for introducing a granular reducing agent into the reducing chamber comprising a conduit arranged spirally around the axis of the cylindrical body adjacent the end of the reducing chamber nearest the roasting chamber, said conduit having one end opening into the reducing chamber and having a portion extended tangentially from the exterior surface of the reducing chamber and open to receive the said granular material, and a receptacle for the granular material arranged to have the open tangential end of the conduit intermittently pass therethrough to pick up material during the rotation of the cylindrical body.

JULIUS LOHSE.